Figure 1:
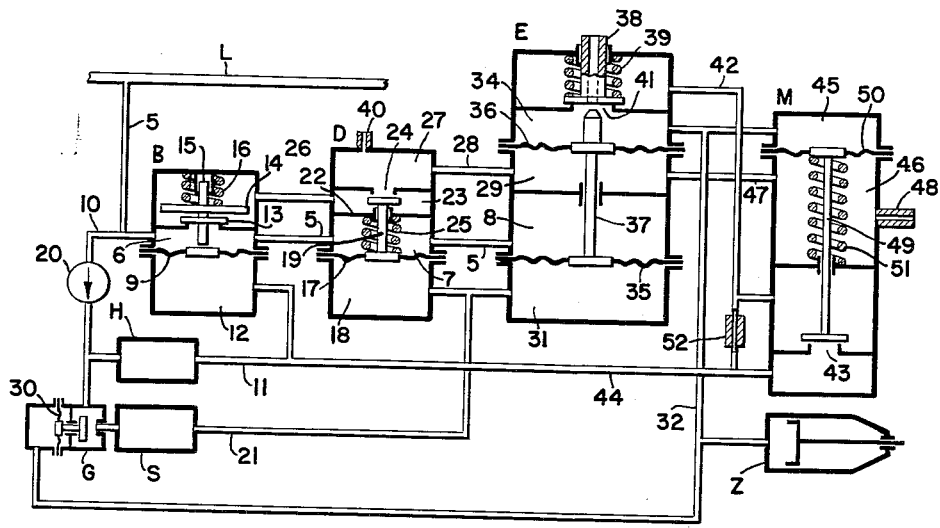

Aug. 2, 1955  S. KELLER  2,714,534

CONTROL DEVICE FOR COMPRESSED AIR BRAKES

Filed Jan. 17, 1952

*INVENTOR*
SIEGFRIED KELLER

BY
*ATTORNEYS*

United States Patent Office 2,714,534
Patented Aug. 2, 1955

2,714,534

CONTROL DEVICE FOR COMPRESSED AIR BRAKES

Siegfried Keller, Effretikon, Switzerland, assignor to Machine Tool Works Oerlikon, Administration Company, Zurich-Oerlikon, Switzerland, a Swiss company Application January 17, 1952, Serial No. 266,829

3 Claims. (Cl. 303—33)

With compressed air operated appliances, such as railway brakes, there is often the problem of feeding a container from a compressed air source through a pipe connecting the two parts and, simultaneously, to operate a movable member, such as a piston or a membrane, according to the progressive pressure rise in the container. It may be desirable, to place this member not adjacent to the container. With compressed air brakes for railway carriages, for instance, the brake cylinder and the triple valve depending on the pressure in the former are usually disposed separately and connected by a pipe. In this way, an arrangement is arrived at in which the air from the compressed air source is led first into a control chamber containing the movable member and from there through a passage which is narrower than the chamber and usually consists of a short pipe, into the container to be charged. Due to the flow resistances in the passage the air passing into the control chamber is retarded at the beginning of the air flow whereby a static pressure is produced which precedes the pressure building up faster or slower, depending on the container size. At the end of the flow the two pressures become one. Due to this fact, the movable member is temporarily subjected to a pressure which is higher than the pressure in the container at that moment.

It is the object of the present invention to eliminate this state which is often undesirable. The invention relates to a control device for compressed air operated appliances, particularly compressed air brakes, in which in known manner a container is charged from a compressed air source through a control chamber, which is fitted with a member movable in this chamber under the action of the pressure, and through a passage extending from the control chamber and being narrower than the latter. In accordance with the invention the movable member is subjected to the influence of a pressure shock produced in an auxiliary control chamber and acting against the pressure in the formerly mentioned control chamber. Thereby, the effect of the transient pressure produced by the deceleration of the compressed air flowing into the container on the movable member is eliminated.

Two embodiments of the invention are described below with reference to the drawing.

According to Fig. 1, from a main air pipe L running through the whole length of the railway train a pipe 5 is branched off to the carriage fitted with the compressed air brake. Through the pipe 5 the chamber 6 of an accelerator B or quick service valve device, the chamber 7 of a valve device D for limiting the compressed air bled from the pipe L, and the chamber 8 of a triple valve E are directly provided with compressed air. A conduit 10 containing the check valve 20 branches off from the pipe 5 and is connected with the auxiliary air container H, as well as with the control air container S, through the valve G. In order to actuate the valve G a space enclosed by the diaphragm 30 is connected to the conduit 32 leading to the brake cylinder Z. The connection of the main air pipe with the two containers H and S is used to charge them when they are empty, or after braking. This charging procedure does not constitute the subject of the present invention and is described, for example, in U. S. Patent No. 2,066,404. A membrane 9 of the accelerator B closes the chamber 6 against a further chamber 12, connected to the auxiliary air container H by a pipe 11. On the membrane 9 rests a plunger 15 carrying the valve body of a valve 13 and a piston 14, and normally held in the rest position shown in which the valve 13 is closed, by a weak spring 16. Between the piston 14 and the wall of the casing an intermediate space is provided which permits a flow of compressed air to the chamber above the piston 14 when the valve 13 is open. As long as there is a flow around the piston 14, the latter is pressed upwards by the flowing air and holds the valve 13 open.

The chamber 7 of the valve device D is separated by the membrane 17 from a further chamber 18 connected to the control air container S by the pipe 21. A plunger 19 fastened to the membrane 17 is guided in a separating wall 22 forming an air-tight fit and carries on its end in the chamber 23 the valve body of a valve 24. This valve, which is normally held open by a spring 25 connects the chamber of the accelerator B above the piston 14 via a pipe 26 connected to the chamber 23 with a chamber 27 of the valve device D, which, in turn, communicates through a pipe 28 with an auxiliary chamber 29 of the triple valve E.

Apart from the auxiliary chamber 29, the triple valve E comprises the usual three control chambers; i. e. the chamber 8 already mentioned, a chamber 31 connected to the control air container S by the pipe 21, and a chamber 34 connected to the brake cylinder Z forming an actuator for the brake by the pipe 32. The free end of the plunger 37 fastened to the membranes 35 and 36 serves for actuating the perforated valve body 38 of the double valve 41, which is normally pressed on to its seat by a spring 39. When the plunger 37 is in the rest position shown the chamber 34 and thus the brake cylinder Z communicate with the atmosphere through the bore of the valve body 38. If, however, the valve body 38 is lifted off its seat this communication of the cylinder Z with the atmosphere is interrupted and the chamber 34 is connected by the pipe 42, the normally open valve 43 of a valve device M for limiting the first inflow of compressed air into the brake cylinder, and the pipe 44 to the auxiliary air container H without any throttling effects.

The valve device M comprises two control chambers 45, 46 separated by the membrane 50, the former of the chambers being connected to the brake cylinder Z through the pipe 32. The chamber 46, on the other hand, is connected through the pipe 47 to the control chamber 29 of the triple valve E as well as through the throttling point 48 to the atmosphere. The valve body of the valve 43 is connected to the membrane 50 by the plunger 49 and is normally lifted off its seat by the spring 51. The throttling point 52 is arranged parallel to the valve 43 so that when it is closed, the width of the connection leading to the brake cylinder Z is diminished.

The operation of the whole arrangement on braking is as follows.

The containers H and S are filled initially through the described connection with the main air pipe. Since the brake cylinder Z is then in communication with the atmosphere, atmospheric pressure will be present in the chamber above the diaphragm 30, so that the valve G will remain open.

A pressure decrease in the tube L is transmitted directly to the chambers 6, 7 and 8. The valve 13 of the accelerator B is opened by the stronger action of the pressure in the auxiliary air container H, so that compressed air flows from the main air pipe L through the pipe 26, the chamber 23, the open valve 24 and the chamber 27 of the valve device D, the pipe 28, the control chamber 29 of the triple valve E, the pipe 47, the chamber 46 of the valve device M and the throttling point 48 to the atmosphere. Approximately at the same time as the valve 13 of the accelerator B is opened, the plunger 37 in the triple valve E is moved upwards under the action of the pressure difference in the chambers 8 and 31, whereby the pressure of the control air container S which is kept constant during braking prevails in the last mentioned chamber, and whereby its free end closes the bore of the valve body 38 and then lifts the latter. Compressed air then unhinderedly flows from the auxiliary air container H through the pipe 11 and 44, the open valve 43, the pipe 42, the valve 41 and the pipe 32 into the brake cylinder Z and produces a fast pressure rise inside the latter. The pressure of the brake cylinder is transmitted to the chamber above the diaphragm 30 and will close the valve G, so that the pressure in the container S cannot be transmitted either to the main air pipe or to the auxiliary air container H and thus will remain constant during the entire braking. The check valve 20 will prevent as well the flow of compressed air from the auxiliary air container H to the main air pipe. Since each part of the passage from the auxiliary air container H to the brake cylinder Z produces a small reduction of the flow velocity of the air a damming effect is produced in each chamber situated in front of such a passage, which causes a transient pressure rise in this pressure chamber.

During the inshot period described this is particularly the case in the control chamber 34 of the triple valve E, which acts upon the membrane 36 and tends to move the plunger 37 downwards. This effect is, however, undesirable as long as a certain minimum pressure is not reached in the brake cylinder. Due to the throttling point 48, the compressed air vented from the main pipe L produces in the chamber 29 of the triple valve E a pressure shock acting against that in the chamber 34. By suitably choosing the size of the throttling point 48 and the chambers passed by the vented air the pressures mentioned, acting against each other on the membrane 36 can be adjusted to each other. It may be of advantage to arrange parallel to the throttling point 40 a further throttling point leading to the atmosphere in front of the chamber 29, e. g. in the chamber 27 of the valve device D.

The compressed air flowing from the auxiliary air container H to the brake cylinder Z causes a pressure rise not only in the chamber 34 of the triple valve E but also in the chamber 45 of the valve device M, by which the valve 43 might, under certain circumstances, be prematurely closed. For this reason the compressed air bled from the main pipe L is also led into the chamber 46 of this valve device, where it acts against the pressure in the chamber 45.

Since the valve 13 of the accelerator is designed as a dynamic valve and is not rigidly connected to the membrane 9 it remains open as long as there is an air flow, even if the membrane 9 may have moved downwards. Bleeding off is interrupted only when the pressure in the main pipe L transmitted to the chamber 7 has dropped to a certain value. At this moment, the spring 25 in the valve device D is no more sufficient to keep the valve 24 open so that the latter closes and interrupts the bleeding off. The pressure still prevailing in the chambers 29 and 46 is equalized through the throttle point 48 to the atmosphere, so that in the triple valve E the membrane 36 is now exclusively subjected to the pressure in the brake cylinder, while the spring 51 alone acts against the pressure in the brake cylinder on the membrane 50 in the valve device M. If this pressure has risen to a certain minimum value it overcomes the force of the spring 51 and closes the valve 43. Thereby, the throttle point 52 is switched on in the pipe 42, 44, which controls the charging time of the brake cylinder and prevents the occurrence of any pressure substantially higher than that inside the brake cylinder in the chamber 34 of the triple valve E. After drop in pressure in the main air pipe to a predetermined value preset by the engineer, the pressure in the chamber 34 will continue to rise due to the increase in pressure in the brake cylinder Z, until it suffices to overcome, jointly with the pressure of the main air pipe in the chamber 8, the constant pressure of the control air container S prevailing in the chamber 31, whereupon the plunger 37 is moved downwardly. The supply of compressed air from the auxiliary air container H to the brake cylinder Z is thus interrupted by the valve 41 without opening the connection of the chamber 34 with the atmosphere through the hollow valve body 38; this prevents further increase in pressure in the chamber 34. The triple valve E remains in this position until pressure in the main air pipe is increased or lowered. The valves M and G remain closed under the influence of brake cylinder pressure, while the accelerator B is closed as soon as pressure in the auxiliary air container H has dropped approximately to the pressure in the main air pipe.

Figure 2:
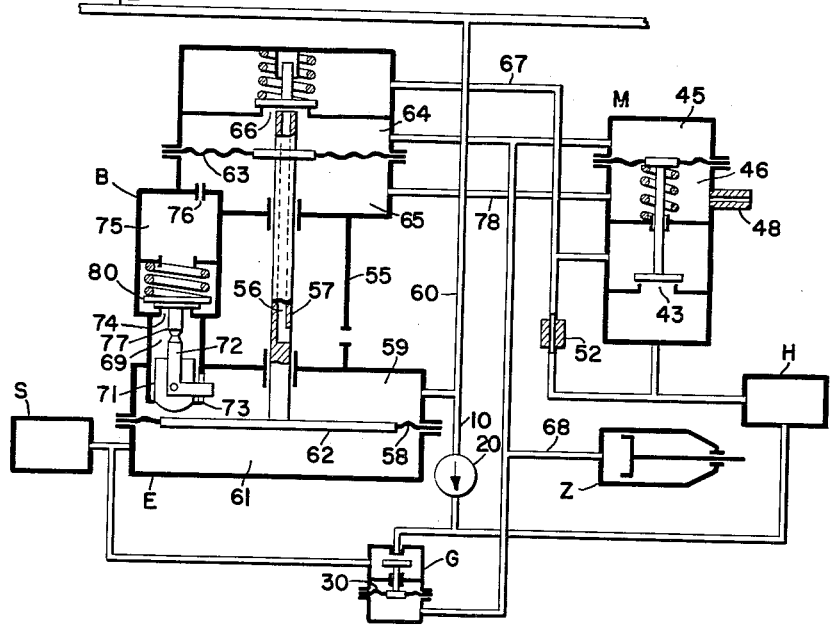

In the embodiment according to Fig. 2, an accelerator B directly actuated by the triple valve is shown, which is of known type, as described in my co-pending patent application, Ser. No. 75,824, filed February 11, 1949, now Patent #2,595,466, and also fulfills the function of the valve device D shown in Fig. 1. In a casing 55 a valve plunger 57 is movably guided which is fitted with a bore 56 over part of its length. Its lower end projects into a casing portion, divided in two chambers 59, 61 by a membrane 58, and is fastened to a disk 62 connected with the membrane 58. The chamber 59 is connected through the pipe 60 to the main air pipe L while the chamber 61 communicates with the control air container S. The upper portion of the plunger 57 projects into a casing portion which is also divided in two chambers 64, 65 by a membrane 63, and is rigidly fastened to this membrane. The chamber 64 has an entry controlled by a spring loaded valve 66 and communicating with the auxiliary air container H through a pipe 67, and is otherwise connected to the brake cylinder Z by the pipe 68.

The accelerator B built together with the triple valve E comprises, in its lower portion, a chamber 69 constructed to form a cylindrical guide and connected with the chamber 59. In this chamber 69 a body 71 carrying a rotatable right angled bell crank 72, is movably guided parallel to the axis of the plunger 57, whereby it rests normally on the disk 62. The portion of the bell crank 72 which is perpendicular to the axis of the plunger 57 projects through a slot 73 in the said guide into the chamber 59 in such a manner, that it abuts the upper limiting wall of the chamber 59 if the body 71 moves upwards and thereby rotates about its mounting joint on the body 71. Through a valve 74 which is designed as a dynamic valve similar to the valve 13 shown in Fig. 1, the chamber 69 communicates with a larger transmission chamber 75, which is also connected to the chamber 65 by a throttling point 76. The spring loaded valve body 80 is provided with a plunger 77 which, in the rest position of the accelerator shown rests against the portion of the crank 72 which is parallel to the plunger.

The valve device M is constructed in the same manner as in the embodiment shown in Fig. 1. Its chamber 45 also communicates with the brake cylinder Z through the pipe 68 while its chamber 46 communicates through the pipe 78 with the chamber 65 of the triple valve E and through a throttle bore 48 with the atmosphere. The throttle point 52 for limiting the charging time of the brake cylinder is disposed parallel to the valve 43.

A conduit 10 branches off the conduit 60 through the check valve 20 to the auxiliary air container H and through the usually open valve G to the control air container S. The diaphragm 30 of the valve G is under pressure of the brake cylinder Z.

The operation of the embodiment in accordance with Fig. 2 is as follows.

The filling of the empty containers H and S is effected from the main air pipe L through the conduits 60 and 10 and the check valve 20.

When a pressure drop occurs in the main air pipe L the disk 62 is moved upwards, together with the plunger 57 and the body 71, under the influence of the air container S. Thereby, the lever 72 abuts the plunger 77 and opens the valve 74 so that compressed air is led from the main air pipe L to the transmission chamber 75. The plunger 57 abuts the valve body of the valve 66 during its upward movement and interrupts the connection which before existed between the brake cylinder Z and the atmosphere through the pipe 68, the chamber 64 and the bore 56. On further upwards movement, the plunger 57 lifts the valve body of the valve 66 from its seat and thus connects the auxiliary air container H through the open valve 43, the pipe 67, the chamber 64 and the pipe 68 with the brake cylinder. Since the flow of compressed air is substantially unhindered, a quick first inshot of compressed air into the brake cylinder occurs, which brings the brake shoes in abutment with the wheels of the carriage. This pressure is transmitted to the diaphragm 30 of the valve G, so that the valve is closed and the connection of the control air container with the main air pipe L and the auxiliary air container H is interrupted. Due to the friction resistances in the pipe 68 a damming effect is produced in the chamber 64 which causes an undesirable transient pressure rise acting on the membrane 63, since this pressure occurs before the pressure can be developed in the brake cylinder. Due to the communication between the transmission chamber 75 and the chamber 65 through the throttle point 76 a pressure acting against the pressure in the chamber 64 is produced in the chamber 65, which prevents the premature closing of the valve 66.

In the operation of the accelerator B described the part of the bell crank 72 perpendicular to the axis of the plunger 57 has been rotated and thereby brought out of contact with the valve plunger 77. Thereby the influence of the membrane 58 on the valve 74 is eliminated. The latter is, however, held open by the air from the main pipe flowing off, until the pressure in the transmission chamber 75 has risen to such an extent that the flow ceases. The valve is then closed by its spring, so that the passage is closed. The air present in the chambers 75, 65 and 46 is equalized slowly through the throttling opening leading to the atmosphere, so that the membrane 63 of the triple valve E is only subjected to the pressure in the chamber 64. When the transient pressure rise in the chamber 65 drops the transient pressure rise in the chamber 64 produced by the damming of the compressed air flowing from the auxiliary air container to the brake cylinder Z also decreases, as, in the meantime, the valve device M has been actuated and has cut in the throttling bore 52 instead of the direct connection through the valve 43. Thereby, the triple valve E has reached that operative state in which it is only subjected to the pressure in the chamber 59, the chamber 61 communicating with the control air container S and the chamber 64 communicating with the brake cylinder Z.

After drop in pressure in the main air pipe L to a predetermined extent set by the engineer, the pressure in the brake cylinder Z and, consequently in the chamber 64, is increased until it is sufficient jointly with the pressure of the main air pipe in the chamber 59 to overcome the constant pressure of the control air container S prevailing in the chamber 61 and to move the plunger 57 downwardly. The supply of compressed air from the auxiliary air container H to the brake cylinder Z is then interrupted at the valve 66 without opening the connection of the chamber 64 with the atmosphere through the bore 56 in the plunger 57. Thus further increase in pressure in the chamber 64 is prevented. The triple valve E remains in this position until further drop in pressure or an increase in pressure takes place in the main air pipe L. The valves M and G remain closed under the action of brake cylinder pressure, until the brake is released completely.

I claim:

1. In a fluid pressure brake, in combination with a brake line, a normally charged fluid pressure reservoir and a normally exhausted actuator to be filled from said reservoir; a triple valve including three pressure chambers, valve means connecting said reservoir with a first one of said pressure chambers, and operating means for said valve means comprising loading means and subjected to the resultant effect of the pressure in said three pressure chambers and of said loading means, to normally close said valve means under the opposing effects of said loading means and of the pressure in the second one of said pressure chambers connected with said brake pipe, to open said valve means upon a reduction of brake pipe pressure and to close said valve means again dependent on the pressure arising in said first pressure chamber after the opening of said valve means; a passage connecting said first pressure chamber with said actuator and generating a transient pressure rise in said first pressure chamber upon the opening of said valve means; a quick service valve device connecting the brake line with a third one of said pressure chambers to vent fluid pressure from the brake line into said third pressure chamber upon a reduction of brake pipe pressure; an outlet forming a restricted connection of said third pressure chamber with the atmosphere to generate transient pressure in said third pressure chamber upon a reduction of brake pipe pressure to neutralize the effect of the transient pressure rise in said first pressure chamber, said quick service valve device comprising means for interrupting the venting of fluid pressure from the brake line to said third pressure chamber to effect a decrease of the transient pressure in said third pressure chamber.

2. In a fluid pressure brake, in combination with a brake pipe, a normally charged fluid pressure reservoir and a brake cylinder; a triple valve including a first pressure chamber, valve means connecting said reservoir with said first pressure chamber, a second pressure chamber, a restricted outlet connecting said second pressure chamber to the atmosphere; a first diaphragm separating said two pressure chambers from each other, a second diaphragm, a third pressure chamber connected with the brake pipe and closed by said second diaphragm, loading means adapted to counteract the effect of the pressure in said third pressure chamber on said second diaphragm and actuating means for said valve means forming a driving connection with said two diaphragms and adapted to normally close said valve means under the opposing effects of the pressure in said third pressure chamber and said loading means, further to open said valve means upon a reduction of brake pipe pressure and to close said valve means again dependent on the pressure arising in said first pressure chamber after the opening of said valve means; a passage connecting the brake cylinder with said first pressure chamber to generate a transient pressure rise in said first pressure chamber during the flow of fluid from said reservoir to said brake cylinder; a quick service valve device connecting the brake line with said second pressure chamber and adapted to be operated by said second diaphragm upon a reduction in brake pipe pressure to vent fluid from said brake pipe to said second pressure chamber and to automatically interrupt the venting of fluid pressure from said brake pipe dependent on a predetermined drop of pressure in the brake line, whereby a transient pressure is generated in said second pressure chamber by the fluid vented from said brake pipe and bleeding into the atmosphere by said outlet to neutralize the effect of the transient pressure rise in said first pressure chamber.

3. In a fluid pressure brake according to claim 1, control means for varying the width of said passage and comprising actuating means connected with said first and second pressure chambers to influence said actuating means by the opposing pressures in said first and second pressure chambers and comprising loading means for said actuating means to sustain the effect of the pressure in said second pressure chamber on said actuating means and preventing the operation of said actuating means below a predetermined pressure in said actuator, whereby the effect of the transient pressure rise arising in said first pressure chamber after the opening of said valve means is neutralized by the transient pressure arising in said second pressure chamber.

References Cited in the file of this patent

UNITED STATES PATENTS

| | | |
|---|---|---|
| 1,693,943 | Thomas | Dec. 4, 1932 |
| 2,066,404 | Kasantzeff | Jan. 5, 1937 |
| 2,376,680 | Gallusser | May 22, 1945 |
| 2,543,099 | Eaton | Feb. 27, 1951 |
| 2,595,466 | Keller | May 6, 1952 |